US010912097B2

(12) United States Patent
Tian et al.

(10) Patent No.: US 10,912,097 B2
(45) Date of Patent: Feb. 2, 2021

(54) PRIORITY CLASS INDICATION FOR BASE STATION MCOT SHARING FOR AUL (71) Applicant: QUALCOMM INCORPORATED, San Diego, CA (US)

(72) Inventors: Qingjiang Tian, San Diego, CA (US); Srinivas Yerramalli, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/276,101

(22) Filed: Feb. 14, 2019

(65) Prior Publication Data

US 2019/0261382 A1  Aug. 22, 2019

Related U.S. Application Data (60) Provisional application No. 62/710,336, filed on Feb. 16, 2018.

(51) Int. Cl.
*H04W 72/10* (2009.01)
*H04W 72/04* (2009.01)
(Continued)

(52) U.S. Cl.
CPC ....... *H04W 72/10* (2013.01); *H04W 72/0406* (2013.01); *H04W 74/0808* (2013.01);
(Continued)

(58) Field of Classification Search
CPC ............. H04W 36/20; H04W 72/0406; H04W 72/042; H04W 72/10; H04W 74/04; H04W 74/0808; H04W 88/02; H04W 88/08

See application file for complete search history.

(56) References Cited

U.S. PATENT DOCUMENTS

2017/0238342 A1  8/2017 Yang et al.
2017/0265191 A1* 9/2017 Ahmed ............ H04W 74/0808
(Continued)

FOREIGN PATENT DOCUMENTS

WO  WO-2016200546 A1  12/2016
WO  WO-2018075745 A1  4/2018

OTHER PUBLICATIONS

Intel Corporation "A Framework to Enable Autonomous Uplink Access," 3GPP Draft; R1-1712478, 3rd Generation Partnership Project (3GPP), Mobile Competence Centre; 650, Route Des Lucioles; F-06921 Sophia-Antipolis Cedex; France, vol. RAN WG1, No. Prague, P.R. Czechia; Aug. 21, 2017-Aug. 25, 2017, Aug. 20, 2017, XP051315294, 4 pages, Retrieved from the Internet: URL: http://www.3gpp.org/ftp/Meetings_3GPP_SYNC/RAN1/Docs/ [retrieved on Aug. 20, 2017] abstract paragraph [002.] paragraph [03.2]—paragraph [04.2].

(Continued)

Primary Examiner — Kan Yuen
(74) Attorney, Agent, or Firm — Liem T. Do (57) ABSTRACT Indication of transmission priority class is disclosed for sharing a base station's maximum channel occupancy time (MCOT) for use in autonomous uplink (AUL). Aspects of the disclosure provide for implicitly sharing the MCOT by providing an indication of transmission opportunity (TxOP) length. A serving base station sends an indication of a current TxOP length in control signals to a user equipment (UE). The UE may then infer a set of potential transmission priorities used by the serving base station according to the TxOP length, as TxOP length may relate to the MCOT, which itself may be associated with a particular transmission priority class. The UE may then, conservatively, select the highest transmission priority of the set of potential transmission priorities for autonomously transmitting any uplink (Continued)

data having at least the selected highest transmission priority within configured AUL resource of the current TxOP.

6 Claims, 8 Drawing Sheets

(51) Int. Cl.
    *H04W 74/08* (2009.01)
    *H04W 88/02* (2009.01)
    *H04W 88/08* (2009.01)
    *H04W 74/04* (2009.01)

(52) U.S. Cl.
    CPC ............ *H04W 74/04* (2013.01); *H04W 88/02* (2013.01); *H04W 88/08* (2013.01)

(56) References Cited

U.S. PATENT DOCUMENTS

2019/0150184 A1* 5/2019 Golitschek Edler von
                      Elbwart ................. H04W 8/24
                                     370/329
2020/0037359 A1* 1/2020 Wang ................. H04W 74/006

OTHER PUBLICATIONS

International Search Report and Written Opinion—PCT/US2019/018147—ISA/EPO—dated May 24, 2019.

* cited by examiner

PRIORITY CLASS INDICATION FOR BASE STATION MCOT SHARING FOR AUL

CROSS-REFERENCE TO RELATED APPLICATIONS

This application claims the benefit of U.S. Provisional Patent Application No. 62/710,336, entitled, "PRIORITY CLASS INDICATION FOR BASE STATION MCOT SHARING FOR AUL," filed on Feb. 16, 2018, which is expressly incorporated by reference herein in its entirety.

BACKGROUND

Field

Aspects of the present disclosure relate generally to wireless communication systems, and more particularly, to priority class indication for base station maximum channel occupancy time (MCOT) sharing for autonomous uplink (AUL).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a UE, control signals from a serving base station including at least a transmission opportunity (TxOP) length of a current TxOP of the serving base station, inferring, by the UE, a set of potential transmission priorities used by the serving base station to secure the channel access according to the TxOP length, selecting, by the UE, a highest transmission priority of the set of potential transmission priorities, and autonomously transmitting, by the UE, data having at least the selected highest transmission priority within a configured autonomous uplink (AUL) resource of the current TxOP.

In an additional aspect of the disclosure, a method of wireless communication includes receiving, by a UE, control signals including at least a transmission priority used by a serving base station to secure a current TxOP of the serving base station, identifying, by the UE, uplink data having at least the transmission priority indicated in the control signals, and autonomously transmitting, by the UE, the uplink data within a configured AUL resource of the current TxOP.

In an additional aspect of the disclosure, an apparatus configured for wireless communication includes means for receiving, by a UE, control signals from a serving base station including at least a TxOP length of a current TxOP of the serving base station, means for inferring, by the U E, a set of potential transmission priorities used by the serving base station to secure the channel access according to the TxOP length, means for selecting, by the UE, a highest transmission priority of the set of potential transmission priorities, and means for autonomously transmitting, by the UE, data having at least the selected highest transmission priority within a configured AUL resource of the current TxOP.

In an additional aspect of the disclosure, an apparatus configured for wireless communication includes means for receiving, by a UE, control signals including at least a transmission priority used by a serving base station to secure a current TxOP of the serving base station, means for identifying, by the UE, uplink data having at least the transmission priority indicated in the control signals, and means for autonomously transmitting, by the UE, the uplink data within a configured AUL resource of the current TxOP.

In an additional aspect of the disclosure, a non-transitory computer-readable medium having program code recorded thereon. The program code further includes code to receive, by a UE, control signals from a serving base station including at least a TxOP length of a current TxOP of the serving base station, code to infer, by the UE, a set of potential transmission priorities used by the serving base station to secure the channel access according to the TxOP length, code to select, by the UE, a highest transmission priority of the set of potential transmission priorities, and code to autonomously transmit, by the UE, data having at least the selected highest transmission priority within a configured AUL resource of the current TxOP.

In an additional aspect of the disclosure, a non-transitory computer-readable medium having program code recorded thereon. The program code further includes code to receive, by a UE, control signals including at least a transmission priority used by a serving base station to secure a current TxOP of the serving base station, code to identify, by the UE, uplink data having at least the transmission priority indicated in the control signals, and code to autonomously transmit, by the UE, the uplink data within a configured AUL resource of the current TxOP.

In an additional aspect of the disclosure, an apparatus configured for wireless communication is disclosed. The apparatus includes at least one processor, and a memory coupled to the processor. The processor is configured to receive, by a UE, control signals from a serving base station including at least a TxOP length of a current TxOP of the serving base station, to infer, by the UE, a set of potential transmission priorities used by the serving base station to secure the channel access according to the TxOP length, to select, by the UE, a highest transmission priority of the set of potential transmission priorities, and to autonomously transmit, by the UE, data having at least the selected highest transmission priority within a configured AUL resource of the current TxOP.

In an additional aspect of the disclosure, an apparatus configured for wireless communication is disclosed. The apparatus includes at least one processor, and a memory coupled to the processor. The processor is configured to receive, by a UE, control signals including at least a transmission priority used by a serving base station to secure a current TxOP of the serving base station, to identify, by the UE, uplink data having at least the transmission priority indicated in the control signals, and to autonomously transmit, by the UE, the uplink data within a configured AUL resource of the current TxOP.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Figure 1:
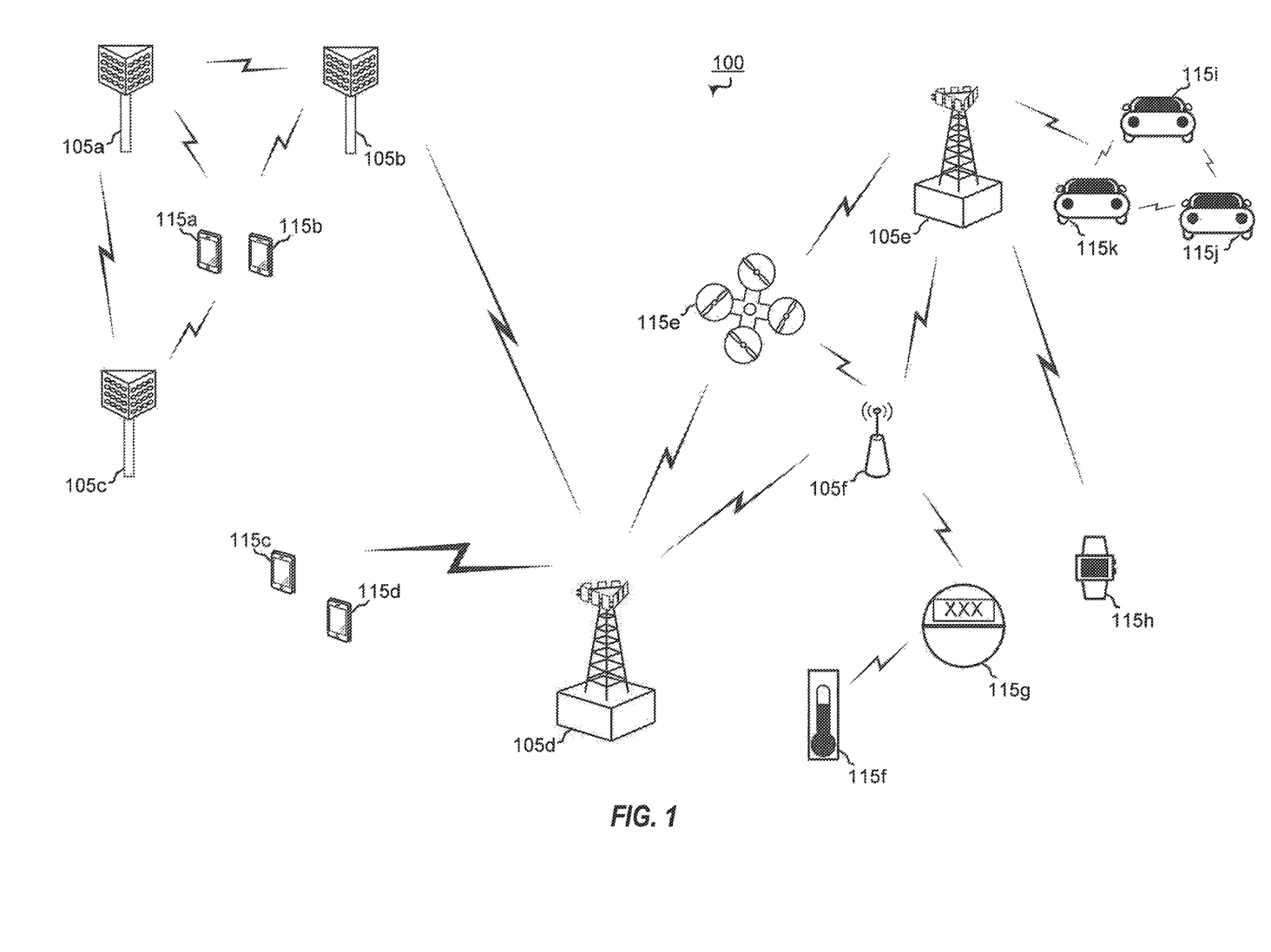
FIG. 1 is a block diagram illustrating details of a wireless communication system.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
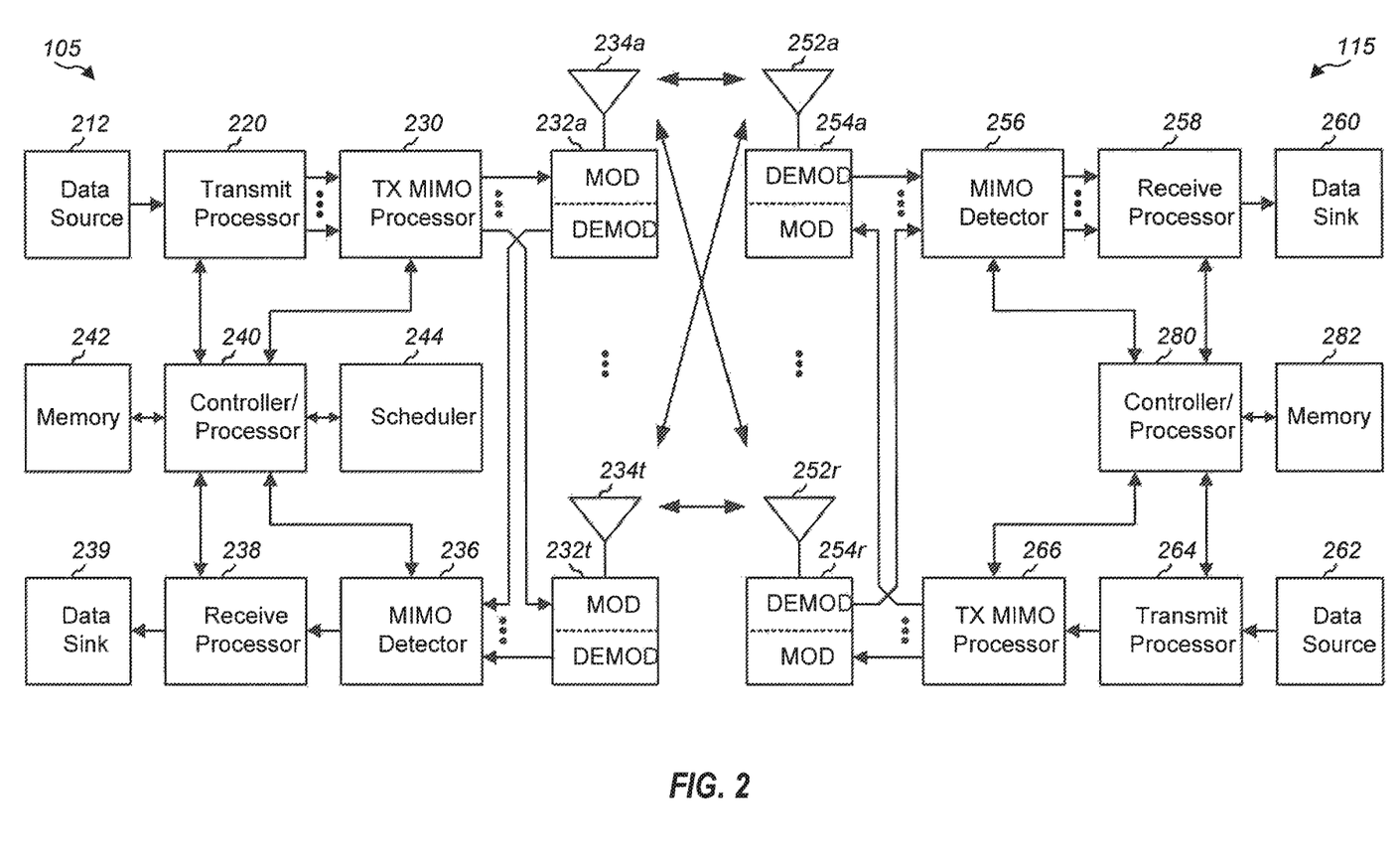
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
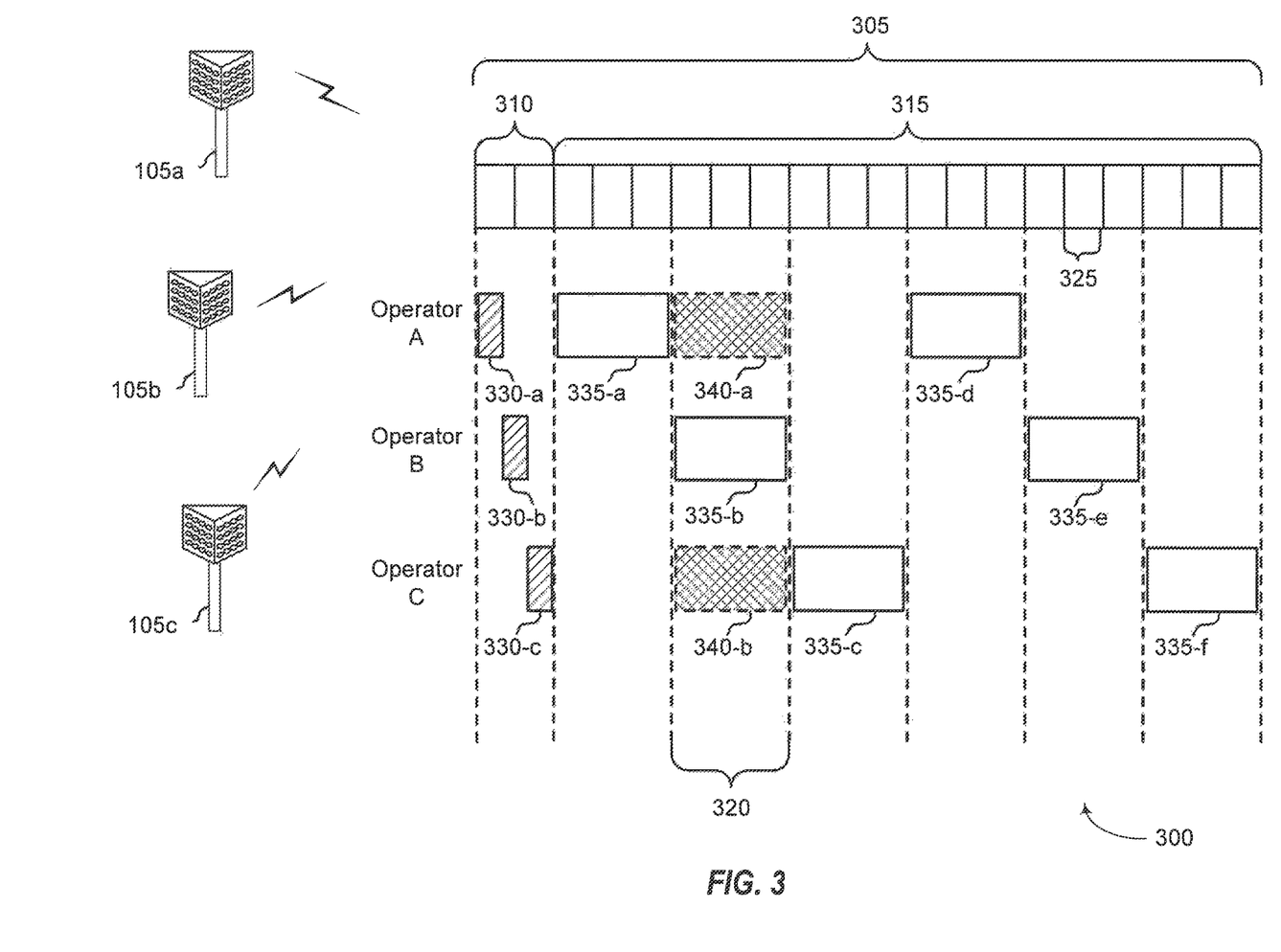
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In license assisted access (LAA), depending on the priority of the traffic (priority class), there may be different available dimensions for contention window size (CWS) and the associated maximum channel occupancy time (MCOT) that can be supported. Higher priority class traffic (lower priority) uses a longer contention window, but the transmission opportunity (TxOP) can be longer. Table 1 below identifies the different priority classes and their corresponding MCOT lengths that have been suggested in the standards specifications.

TABLE 1

| Priority Class | MCOT (ms) | CWS |
|---|---|---|
| 1 | 2 | {3, 7} |
| 2 | 3 | {7, 15} |
| 3 | 6 or 10 | {15, 31, 63, 127, 255, 511, 1023} |
| 4 | 6 or 10 | {15, 31, 63, 127, 255, 511, 1023} |

Current suggestions would provide for a base station to share the MCOT for autonomous uplink (AUL) operations. In such base station-acquired MCOT, the AUL UE detects the common PDCCH (C-PDCCH) to determine whether its configured AUL resource falls within the base station's TxOP. The C-PDCCH carries a field that indicates the number of downlink and uplink subframes in the TxOP. If the AUL resource configured for the AUL UE is within the uplink subframes of the C-PDCCH-indicated TxOP, the AUL UE can perform a shortened listen before talk (LBT) procedure (e.g., Category 2 or 25 μs LBT) to start transmissions in the configured AUL resource within the shared MCOT if LBT succeeds. If the base station decides to share with an AUL UE, it may consider ensuring that the data transmitted by the AUL UE in the shared MCOT is of an appropriate priority class. It may be considered an unfair channel sharing for a UE to transmit lower priority traffic when the base station has used a higher priority traffic to contend for the channel. A UE would not necessarily know the priority class used by the base station. Therefore, the base station may indicate this priority to the AUL UEs. Various aspects of the present disclosure are directed to different options for the base station to indicate to AUL UEs the priority class used for the current TxOP.

Figure 4:
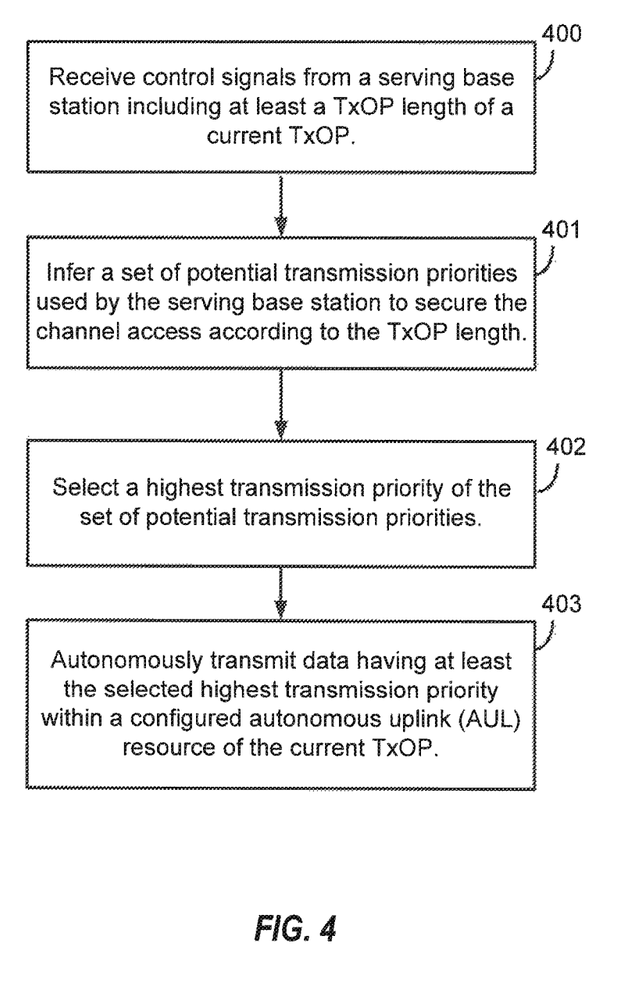
FIG. 4 is a block diagram illustrating example blocks executed to implement one aspect of the present disclosure.
Figure 8:
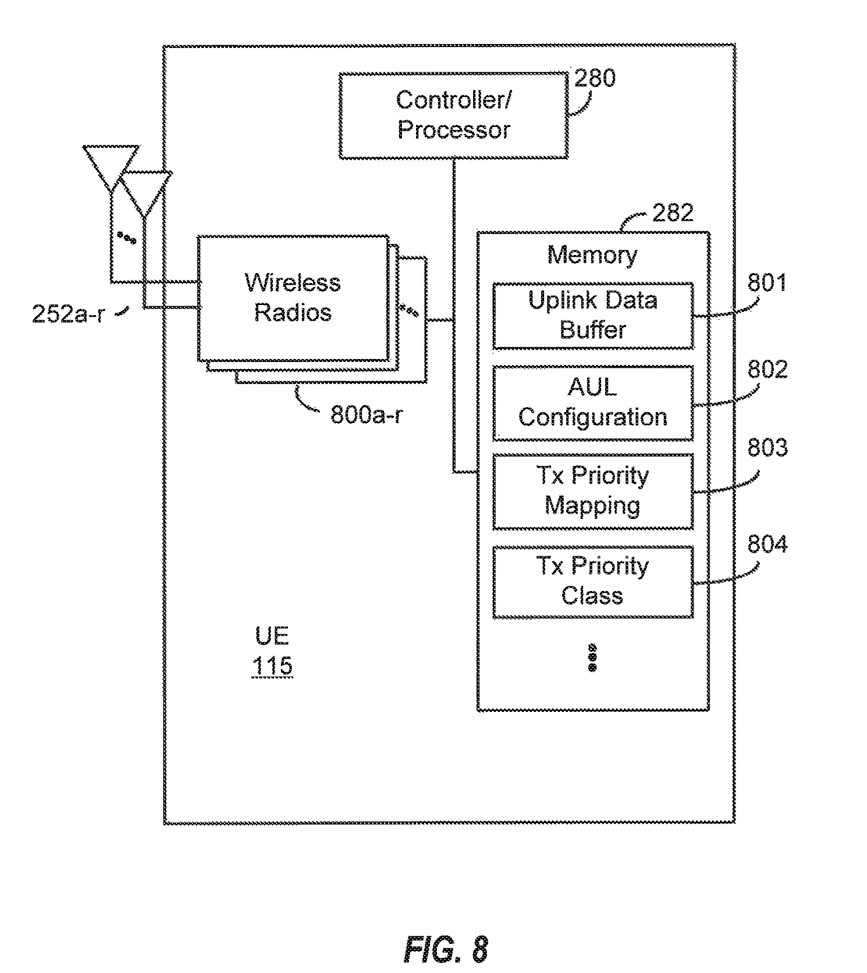
FIG. 8 is a block diagram illustrating detail of an example UE configured according to aspects of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE receives a control signals from a serving base station including at least a TxOP length of a current TxOP of the serving base station. For example, UE 115 may detect and receive control signals (e.g., C-PDCCH, PDCCH, etc.) via wireless antennas 252a-r and wireless radios 800a-r. The control signals may include an indication of the TxOP length. In one example implementation, the length may be indicated by identifying the number of uplink and downlink subframes or slots within the current TxOP.

At block 401, the UE infers a set of potential transmission priorities used by the serving base station to secure the channel access according to the TxOP length. For example, under control of controller/processor 280, UE 115 executes transmission priority mapping logic 803, stored in memory 282. The execution environment of transmission priority mapping logic 803 allows for UE 115, by examining the TxOP length, to infer one or more possible transmission priorities that were used by the serving base station LBT to secure the channel. The shorter the TxOP, the higher priority was likely used by the serving base station. As indicated above, higher transmission priorities generally include shorter, more aggressive contention window sizes and shorter MCOTs, to allow more transmission opportunities. Thus, by examining the TxOP length, UE 115 may infer a set of possible transmission priorities.

At block 402, the UE selects a highest transmission priority of the set of potential transmission priorities. When UE 115 has uplink data that may be sent in AUL transmissions, UE 115 selects the highest priority of the set of priorities inferred and stores it at transmission priority class 804 in memory 282. Attempting to match priority not only suggests an attempt at transmission fairness (e.g., not transmitting lower priority data when a higher priority was used to secure the channel), but also that lower transmission priority may suggest a longer MCOT, which may exceed the MCOT associated with a higher priority actually used by the serving base station.

At block 403, the UE autonomously transmits data having at least the selected highest transmission priority within a configured AUL resource of the current TxOP. With the TxOP length known and the most conservative transmission priority selected, UE 115 may determine whether the AUL resources configured for UE 115 via control signals fall within an uplink subframe of the current TxOP. The identification of AUL resources would be stored in memory 282 at AUL configuration 802. In selecting data for AUL transmissions, UE 115 should select the highest possible priority data that may match the priority used by the serving base station to secure the channel. All uplink data for transmission may be maintained by UE 115 in uplink buffer 801 in memory 282. UE 115 would select the data from uplink data buffer 803 with at least as high a transmission priority as the selected transmission priority stored at transmission priority class 804. UE 115 may then autonomously transmit, via wireless radios 800*a-r* and antennas 252*a-r*, the data that has at least the matching selected highest transmission priority within the configured AUL resources of the current TxOP.

Figure 5:
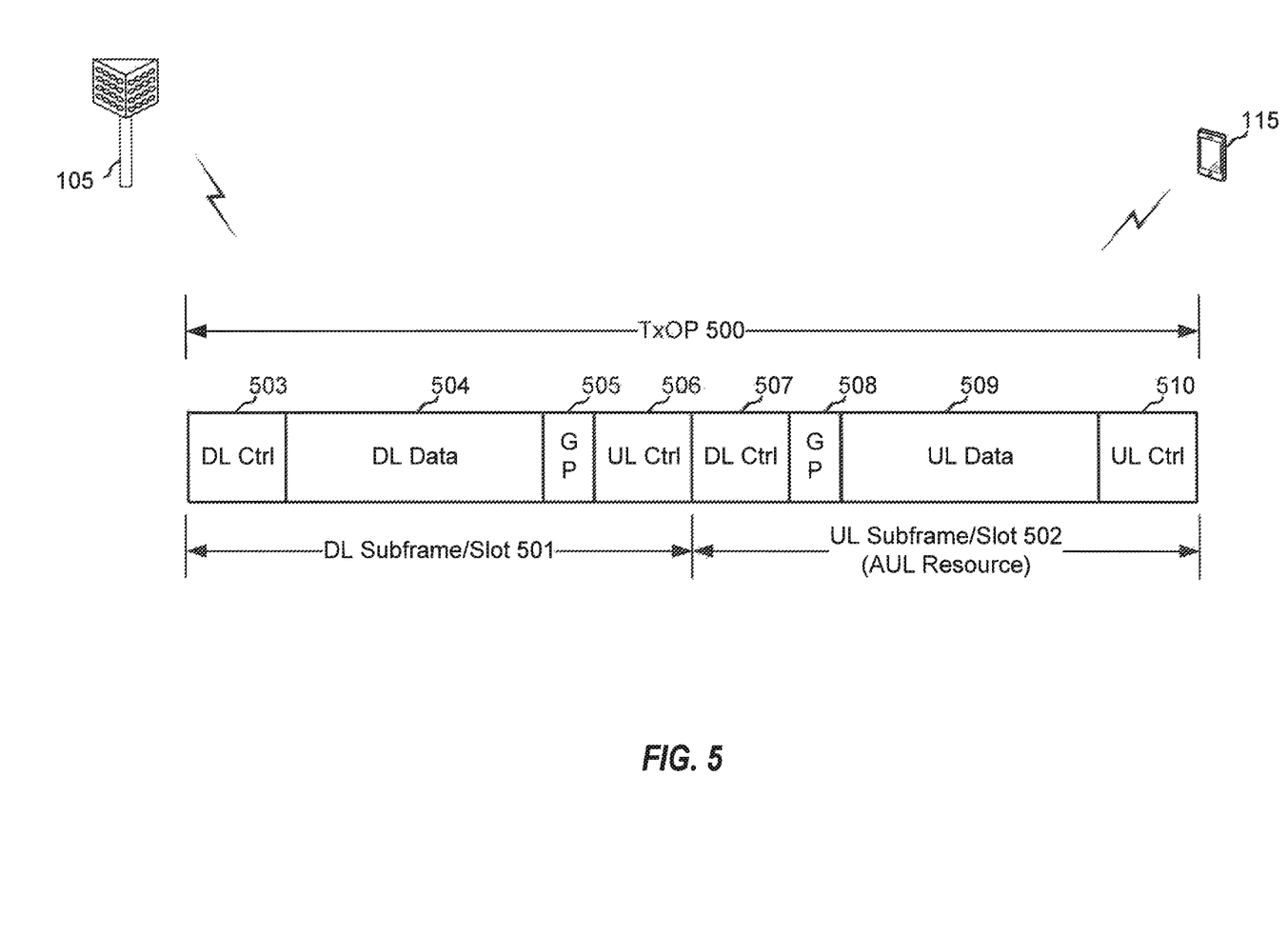
FIG. 5 is a block diagram illustrating and an example base station and UE configured according to one aspect of the present disclosure.

FIG. 5 is a block diagram illustrating an example base station 105 and UE 115 configured according to one aspect of the present disclosure. Base station 105 intends for downlink data and perhaps to schedule uplink data from UE 115. Prior to transmission, base station 105 performs an LBT procedure (not shown). The operation of the LBT procedure will depend on the transmission priority of the data to be transmitted. A higher transmission priority would provide for a shorter TxOP through a shorter MCOT, along with a more aggressive contention window size, which allows for shorter back off and contention windows when the channel is first detected as occupied. Upon detecting a successful LBT, base station 105 may define TxOP 500 by the MCOT associated with the transmission priority. In this illustrated example, TxOP 500 is divided into two subframes or slots, downlink subframe/slot 501 and uplink subframe/slot 502, which is identified also within the control signaling as AUL resources.

Within downlink subframe/slot 501, after broadcast of downlink control signal 503, base station 105 may transmit downlink data 504. Following guard period 505, UE 115 may transmit UE control signals 506, which may include ACK/NACK and the like. The second subframe within TxOP 500, uplink subframe/slot 502, is configured as AUL resources. After downlink control signal 507 and guard period 508, UE 115 would autonomously transmit uplink data 509 to base station 105 if it has uplink data to transmit and the shared communication channel is unoccupied. UE 115 may perform a shortened LBT procedure to obtain access prior to AUL transmission at uplink data 509. UE 115 may then transmit another control signal at uplink control 510.

According to one aspect of the present disclosure, base station 105 implicitly indicates TxOP length in downlink control 503 (e.g., C-PDCCH, PDCCH, etc.). UE 115, then, infers the transmission priority class potentially used by base station 105 for its LBT of TxOP 500 based on the TxOP length. For example, if the TxOP length is greater than or equal to 4 ms, base station 105 may have used either priority class 3 or 4 to conduct LBT, based on the example parameters of Table 1; if the TxOP length is 3 ms, base station 105 may have used any of priority class 2 or 3 or 4 to conduct LBT; otherwise, if the TxOP length is 2 ms, base station 105 may have used any transmission priority class to conduct LBT. In such case, base station 105 may have used a higher priority class for contention but allocated a shorter TxOP.

In the described aspect, UE 115 may select the most conservative priority class for its own data multiplexing based on the inferred possible transmission priority classes associated with the indicated TxOP length. For example, if UE 115 infers, based on the indicated TxOP length, that base station 105 has used either priority class 3 or 4 to conduct LBT, UE 115 would select priority class 3 for the class that base station 105 used; if UE 115 infers that base station 105 has used priority class 2 or higher to conduct LBT, UE 115 would select priority class 2 for the class that base station 105 used; and if UE 115 infers that base station 105 has used priority class 1 or higher to conduct LBT, UE 115 would select priority class 1 for the class that base station 105 used. Thus, UE 115 would only transmit traffic in the AUL resource that has equal or higher transmission priority class than the selected priority class.

The described aspect produces conservative results, as UE 115 will make the most conservative assumption given the TxOP length indicated by downlink control signal 503. By leveraging the existing TxOP length indicator in the downlink control signal 503 (C-PDCCH, PDCCH, etc.) to infer a set of possible transmission priorities that may have been used by the base station 105 LBT process to secure the channel access. Thus, one benefit of the implicit signaling allows for the indication of the transmission priority class to be conveyed without the need of additional bits in the signaled grant, such as in C-PDCCH, to convey the actual priority used by the base station 105.

Figure 6:
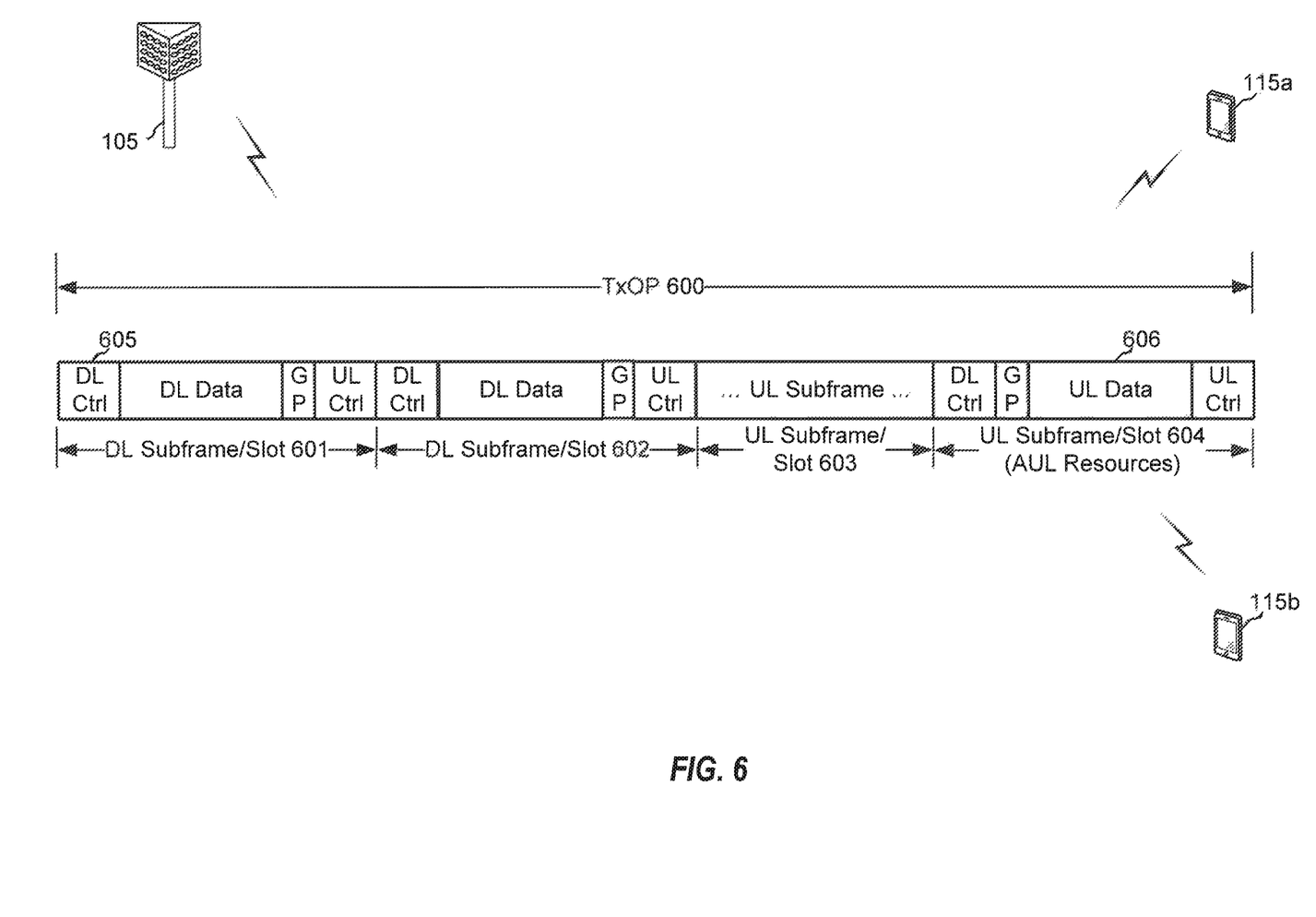
FIG. 6 is a block diagram illustrating an example base station and UEs configured according to one aspect of the present disclosure.

FIG. 6 is a block diagram illustrating an example base station 105 and UEs 115*a* and 115*b* configured according to one aspect of the present disclosure. Base station 105 secures access for transmissions to the shared channel after a successful LBT procedure using a certain transmission priority class. Upon successfully completing the LBT procedure, TxOP 600 is configured with a 4 ms MCOT and four subframes, downlink subframe/slot 601, downlink subframe/slot 602, uplink subframe/slot 603, uplink subframe/slot 604. The detailed component parts of uplink subframe/slot 603 are not illustrated. Uplink subframe/slot 604 is configured as AUL resources and an identifier of such resource is signaled at least in downlink control signal 605.

According to another aspect of the present disclosure, base station 105 may also indicate the priority class in scheduled uplink (SUL) grants. In current enhanced LAA (eLAA) operations, there is already a priority field in the uplink grant format. Thus, the signaling is already there. In such aspect, the UEs with SUL grants in the TxOP would know the priority class eNB 105 used and, therefore, can select AUL traffic priority using the exact knowledge of the priority class used. For example, base station 105 transmits an uplink grant at downlink control signal 605. The uplink grant schedules UE 115*a* for uplink transmission at uplink subframe/slot 603. However, base station 105 also indicates the transmission priority that it used for securing the channel. Accordingly, when UE 115*a* has remaining uplink data for transmission after uplink subframe/slot 603, if the data is at least a priority as high as the actual transmission priority class communicated by base station 105, it may autonomously transmit such data at uplink data 606 within the AUL resources of uplink subframe/slot 604. UE 115*a* may also transmit traffic of lower priority class than indicated in SUL grant, if resource is still available after emptying all data with the same or higher priority indicated in SUL grant.

It should be noted that, for UEs without SUL grants in TxOP 600, such as UE 115*b*, UE 115*b* would infer the set of potential transmission priority classes, as described with respect to FIG. 5, and either select the most conservation inference (e.g., the highest priority), or refrain from transmissions during TxOP 600, such as when it has no data having at least the same priority.

According to another aspect of the present disclosure illustrated in FIG. 6, base station 105 may further indicate the transmission priority class used for LBT in downlink grants. For example, base station 105 transmits a downlink grant at downlink control signal 605 to UE 115*a* for TxOP 600. The downlink grant also includes the indication of the actual transmission priority class used by base station 105 when securing the channel for TxOP 600. With the actual priority class indicated, UE 115*a* would be able to accurately select the AUL traffic priority for AUL transmission at uplink data 606.

It should be noted that, as above, for UEs without either downlink or uplink grants in TxOP 600, such as UE 115*b*, UE 115*b* may again infer the set of potential transmission priority classes, as described with respect to FIG. 5, and either select the most conservation assumption or refrain from transmissions during TxOP 600.

It should further be noted that the described aspect including the actual transmission priority class within a downlink grant may cause additional bits to be added the downlink grant format.

Figure 7:
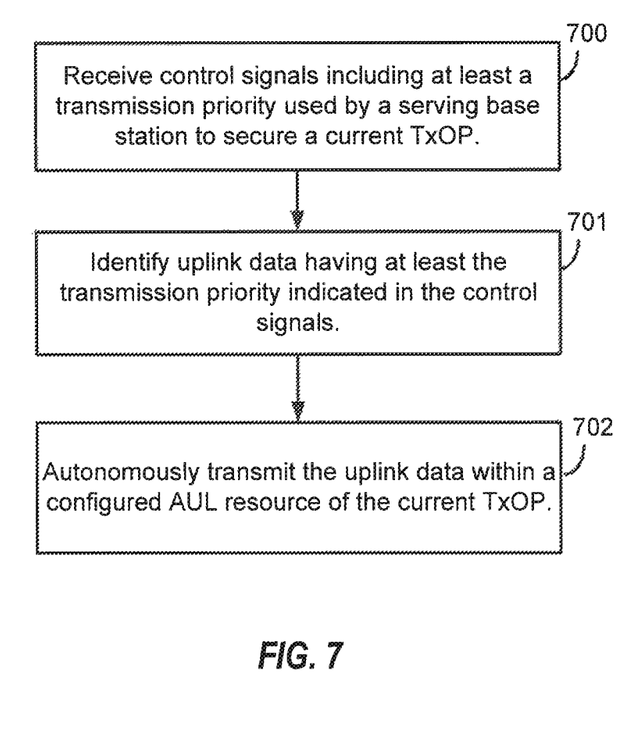
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to UE 115 as illustrated in FIG. 8.

At block 700, a UE receives control signals including at least a transmission priority used by a serving base station to secure a current TxOP of the serving base station. According to another aspect of the present disclosure, a base station may explicitly indicate the transmission priority class used by the base station with the LBT to acquire the channel. For example, the base station may include an indicator within a control signal (e.g., C-PDCCH, PDCCH, etc.) to identify the priority class used (e.g., 2-bits, 3-bits, etc.). UE 115 receives the control signal via antennas 252*a-r* and wireless radios 800*a-r*. The priority is stored at transmission priority class 804 in memory 282.

Further, referring to an alternative aspect illustrated by FIG. 5, the control signal transmitted by base station 105 at downlink control signal 503 may include the indicator of the actual transmission priority used in LBT to secure the channel for TxOP 500. UE 115 receives the control signal and obtains the actual transmission priority class used.

At block 701, the UE identifies uplink data having at least the transmission priority indicated in the control signals. and may identify the exact transmission priority used by the serving base station. UE 115 may then identify any uplink data in its uplink data buffer 801 having at least the same or higher priority.

At block 702, the UE autonomously transmits the uplink data within a configured AUL resource of the current TxOP. Once the correct priority uplink data is identified, UE 115 may autonomously transmit, via wireless radios 800*a-r* and antennas 252*a-r*, the uplink data within the configured AUL resource of the current TxOP. As noted above, UE 115 obtains an indication of the AUL resources in a control signal and stores this information at AUL configuration 802, in memory 282. If the scheduled AUL resources are within the current TxOP, UE 115 will determine its availability to autonomously transmit data.

Further, referring to an alternative aspect illustrated by FIG. 5, UE 115 may transmit the data that has a priority at least as high as the actual transmission priority class identified by base station 105 within the AUL resources of uplink subframe/slot 502 at uplink data 509.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, by a user equipment (UE), control signals including at least a transmission priority used by a serving base station to secure a current transmission opportunity (TxOP) of the serving base station;
identifying, by the UE, uplink data having at least the transmission priority indicated in the control signals; and
autonomously transmitting, by the UE, the uplink data within a configured autonomous uplink (AUL) resource of the current TxOP.

2. The method of claim 1, further including:
performing, by the UE, a shortened listen before talk (LBT) procedure prior to the autonomously transmitting, wherein the autonomously transmitting is performed in response to success of the shortened LBT procedure.

3. An apparatus configured for wireless communication, comprising:
means for receiving, by a user equipment (UE), control signals including at least a transmission priority used by a serving base station to secure a current transmission opportunity (TxOP) of the serving base station;
means for identifying, by the UE, uplink data having at least the transmission priority indicated in the control signals; and
means for autonomously transmitting, by the UE, the uplink data within a configured autonomous uplink (AUL) resource of the current TxOP.

4. The apparatus of claim 3, further including:
means for performing, by the UE, a shortened listen before talk (LBT) procedure prior to execution of the means for autonomously transmitting, wherein the means for autonomously transmitting is performed in response to success of the shortened LBT procedure.

5. An apparatus configured for wireless communication, the apparatus comprising:
at least one processor; and
a memory coupled to the at least one processor,
wherein the at least one processor is configured:
to receive, by a user equipment (UE), control signals including at least a transmission priority used by a serving base station to secure a current transmission opportunity (TxOP) of the serving base station;
to identify, by the UE, uplink data having at least the transmission priority indicated in the control signals; and
to autonomously transmit, by the UE, the uplink data within a configured autonomous uplink (AUL) resource of the current TxOP.

6. The apparatus of claim 5, further including configuration of the at least one processor to perform, by the UE, a shortened listen before talk (LBT) procedure prior to execution of the configuration of the at least one processor to autonomously transmit, wherein the configuration of the at least one processor to autonomously transmit is performed in response to success of the shortened LBT procedure.

* * * * *